(12) United States Patent
Shah et al.

(10) Patent No.: US 10,855,621 B2
(45) Date of Patent: Dec. 1, 2020

(54) TIMESTAMP-BASED PACKET SWITCHING USING A TRIE DATA STRUCTURE

(71) Applicant: CAVIUM, LLC, San Jose, CA (US)

(72) Inventors: Zubin Hemantkumar Shah, Santa Clara, CA (US); Shih-Jeff Chen, Fremont, CA (US); Ravindran Suresh, San Jose, CA (US); Leonid Livak, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 15/894,732

(22) Filed: Feb. 12, 2018

(65) Prior Publication Data

US 2018/0359195 A1 Dec. 13, 2018

Related U.S. Application Data

(60) Provisional application No. 62/516,577, filed on Jun. 7, 2017.

(51) Int. Cl.
*H04L 12/935* (2013.01)
*H04L 29/06* (2006.01)
*H04L 29/12* (2006.01)
*H04L 12/741* (2013.01)
*H04L 12/745* (2013.01)

(52) U.S. Cl.
CPC ...... *H04L 49/3009* (2013.01); *H04L 61/2503* (2013.01); *H04L 61/256* (2013.01); *H04L 69/22* (2013.01); *H04L 45/54* (2013.01); *H04L 45/748* (2013.01)

(58) Field of Classification Search
None
See application file for complete search history.

(56) References Cited

U.S. PATENT DOCUMENTS

| | | | |
|---|---|---|---|
| 7,716,369 B2 * | 5/2010 | Le Pennec | H04L 29/12509 709/245 |
| 7,796,627 B2 | 9/2010 | Hurley et al. | |
| 9,705,775 B2 * | 7/2017 | Zhang | H04L 43/10 |
| 2004/0205245 A1 * | 10/2004 | Le Pennec | H04L 29/12509 709/245 |
| 2005/0172153 A1 * | 8/2005 | Groenendaal | H04W 12/08 726/5 |
| 2013/0117504 A1 * | 5/2013 | Neely | H03K 19/17732 711/104 |
| 2013/0268542 A1 * | 10/2013 | Dinwoodie | H04L 45/748 707/748 |

\* cited by examiner

*Primary Examiner* — Robert M Morlan (57) ABSTRACT

System and method of network packet switching using a table representation of a trie data structure to identify a timestamp (TS) range (or time range) for a received packet based on the packet timestamp (TS). The trie data structure is programmed with a plurality of predetermined time ranges. Each node in the trie data structure corresponds to a TS prefix and is associated with a corresponding predetermined time range. A search engine in the network switch can use the packet TS as a key to traverse the trie data structure and thereby matching the packet TS to a predetermined time range according to a Longest Prefix Match (LPM) process. Provided with the TS ranges of the incoming packets, various applications and logic engines in the network switch can accordingly process the packets, such as determining a new destination IP address and performing channel switch accordingly.

21 Claims, 6 Drawing Sheets

TIMESTAMP-BASED PACKET SWITCHING USING A TRIE DATA STRUCTURE

CROSS-REFERENCE TO RELATED APPLICATION

This application claims benefit and priority of the U.S. Provisional Application No. 62/516,577, filed on Jun. 7, 2017, entitled "TIMESTAMP-BASED PACKET SWITCHING USING A TRIE DATA STRUCTURE," the content of which is herein incorporated by reference in entirety for all purposes.

TECHNICAL FIELD

Embodiments of the present invention are related to the field of communication network systems, and in particular, to packet switching mechanisms in communication network systems.

BACKGROUND

In computer networking, network nodes, such as switches and routers, are typically used to perform packet switching to transmit, receive, process and forward data packets, e.g., between devices or between networks. As data traffic traverses the network nodes, the data packets are received, buffered, queued, and transmitted, resulting in variable latency and throughput depending on many factors including the link capacity and the traffic load on the network. The ever increasing demands of Internet traffic require equipment suppliers to develop faster and more efficient packet switching techniques for managing traffic.

Packet switching is typically performed based on the information contained in the packet headers and according to a combination of various switch management policies and criteria. The Real-time Transport Protocol (RTP) is a network protocol for delivering audio and video data over Internet Protocol (IP) networks and is used extensively in communication and entertainment systems that involve media streaming. An RTP packet usually includes a 32-bit timestamp which specifies the relative time that the packet is generated. Timestamps in the packets may provide important time information for some packet processing operations, e.g., between end hosts as sender and receivers of video data.

Some packet processing applications can be based on time ranges, where packet timestamps are mapped to prescribed time ranges which are used as time information input.

SUMMARY OF THE INVENTION

Disclosed in embodiments herein are mechanisms for determining prescribed timestamp (TS) ranges for packets received at a network switch based on packet timestamps with high efficiency and scalability. Embodiments of the present disclosure therefore can better adjust to new protocols and behaviors within the networks.

Embodiments of the present disclosure use a trie data structure to search for a predetermined TS range for a network data packet, e.g., an IPv4 or IPv6 packet received at a network switch. The network switch includes a table representation of the trie configured with a set of predetermined TS ranges, and a TS range lookup engine configured to match a TS value with a predetermined TS range. The trie includes a hierarchy of nodes and paths linking the nodes, and in some embodiments may be a bitwise trie. Each node in the hierarchy corresponds to a TS prefix and is positioned at a level that matches the corresponding prefix length, and all the descendent nodes share the common TS prefix stored in the node. The node is also associated with one of the predetermined TS ranges. The network switch may further include a trie generation engine that can automatically generate the TS range trie, for example based on a user configuration and through a trie optimization process. In some embodiments, the TS range lookup engine may be implemented using hardware primitives and using optimized Static Random Access Memory (SRAM) having deterministic lookup latency.

During operation, upon receiving the packet, the network switch parses the packet to extract the packet TS. The lookup engine uses the packet TS as a search key to look up the table representation of the trie and thereby identifies a predetermined TS range that encompasses, and thus matches, the packet TS value. The lookup engine may include a Longest Prefix Match (LPM) engine to search for the node in the trie that has the longest TS prefix matching the packet TS. Thus, the TS range associated with the node is the most specific matching TS range to the packet TS.

The network switch may also include various other types of lookup engines or processing engines, e.g., configured in an engine pipeline which may be user configurable. Based on the TS range output from the TS range look up engine, various applications or logic engines can further process the packet, e.g., drop the packet, modify the packet with a new DIP address, forward the packet, analyze the packet, and other applicable processing actions.

Using a trie data structure to compress packet timestamps into TS ranges significantly reduces the memory capacity and memory bandwidth specifications for storing and accessing the TS values in a lookup table, and reduces the specified time to produce a search result of TS range. In addition, high scalability can be achieved in terms of search performance even as the TS width increases and the lookup table size grows.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" "traversing" "searching" "transmitting" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Timestamp-based Packet Switching using a Trie Data Structure

Overall, embodiments of the present disclosure provide a network switch capable of searching through a table representation of a trie data structure to identify a timestamp (TS) range (or a time range) for a received data packet based on a packet TS value. The trie data structure is programmed with a plurality of predetermined time ranges. Each node in the trie stores a TS prefix and is positioned at a level that matches the corresponding prefix length, and all (or many, in certain embodiments) the descendent nodes share the same TS prefix stored in the node. Each node may be assigned with one of the predetermined TS ranges. A search engine in the network switch can use the packet TS as a key to traverse the trie data structure and thereby map the packet TS to a predetermined time range according to a Longest Prefix Match (LPM) process. Provided with the TS ranges of the incoming packets, various applications and logic engines in the network switch can accordingly make decisions for processing the packets.

Figure 1:
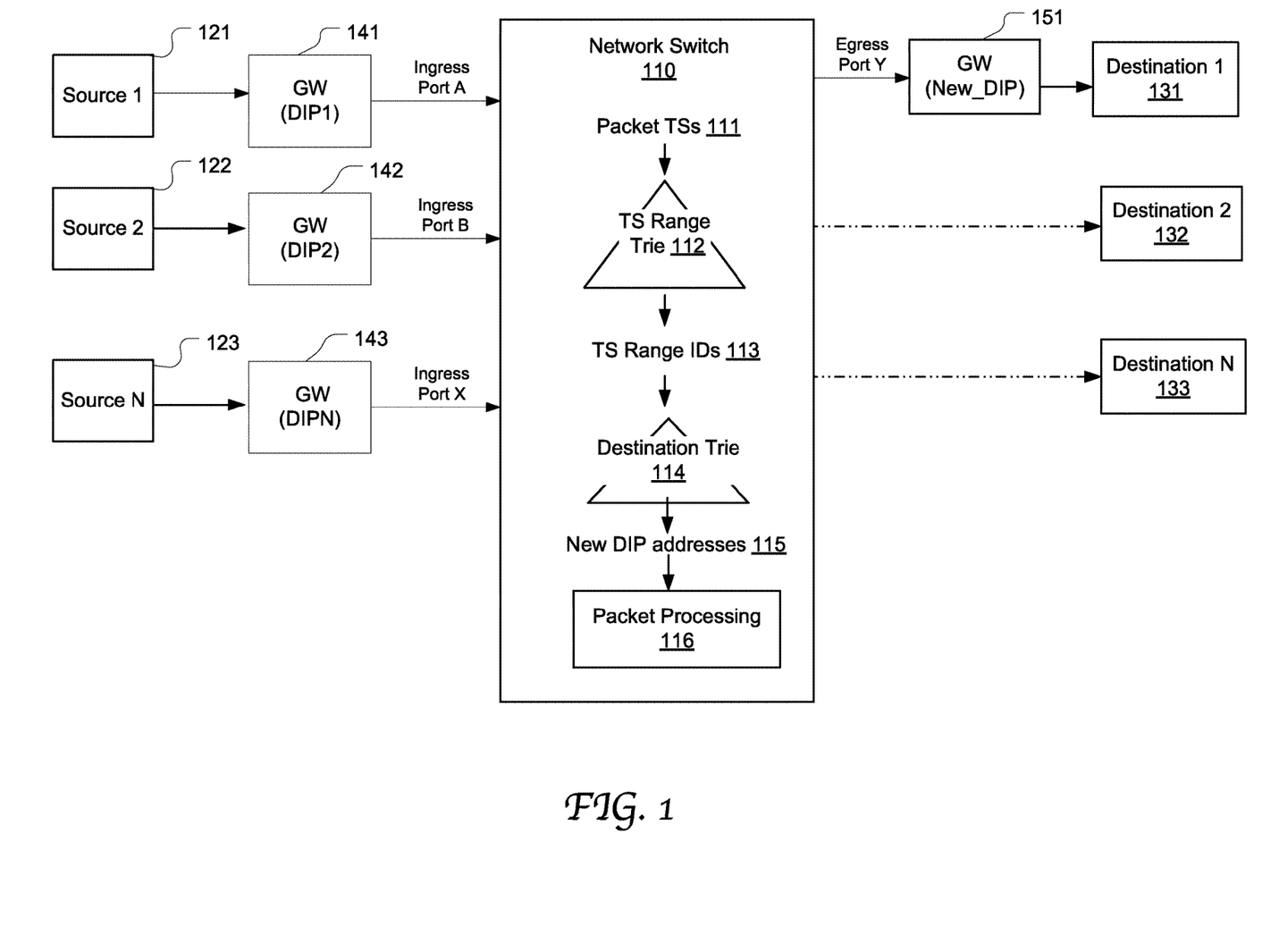
FIG. 1 illustrates a network system utilizing a network switch to perform channel switching (or packet switching) based on packet TS ranges identified by traversing a TS range trie in accordance with an embodiment of the present disclosure.

FIG. 1 illustrates a network system utilizing a network switch 110 to perform channel switching (or packet switching) based on packet TS ranges identified by traversing a TS range trie in accordance with an embodiment of the present disclosure. The network switch 110 is communicatively coupled to multiple source devices that generate streams of packets, such as Real-time Transport Protocol (RTP) packets carrying audio and video data, such as Source 1 121, Source 2, 122 and Source N 123. However, the present disclosure is not limited to any specific communication protocol, packet format or TS format. The data packets may be any packet format, including IPv4 packets, or IPv6 packets.

For instance, the source devices 121-123 may be video cameras, media players, computers, and other electronic equipment. Data packets from the source devices 121-123 are delivered to different ingress ports of the network switch 110 through a communication network, e.g., Ingress ports A, B, and X. The communication network used in the network system can be a local area network (LAN), a wide area network (WAN), a Wireless network, Wi-Fi, a Software-Defined Network (SDN), and any other applicable network.

The network switch 110 is also communicatively coupled to multiple destination devices, such as Destination 1, 131, Destination 2, 132 through Destination N, 133. For example, a destination device may be a monitor terminal for receiving and playing back the data streams generated from the source devices 121-123. As another example, a destination device may be a multicast or broadcast device that can send received data packets to selected devices or to all of its downstream devices.

In this example, the network switch 110 is configured with an application that alternately reroutes the data streams to a single destination device Destination 1 through an egress port Y according to a channel switching schedule. For each specific time range, the data stream from a particular channel is rerouted to Destination 1, 131. The other data streams may be dropped at the switch 110.

In this embodiment, the source devices 121-123 may be coupled to a gateway 141-143 providing Serial Digital Interface (SDI)-to-Internet Protocol (IP) transition. The gateway assigns a destination IP (DIP) address for the data packets from the associated source device, e.g., DIP1 for data packets from Source 1, and DIP2 for data packets from Source 2. However, these DIP addresses are different from the intended device Destination 1 131.

The network switch 110 includes a table representation of a TS range trie 112 and a TS range search engine (or lookup engine) (not explicitly shown). Upon a data packet being received by the network switch 110, the packet TS 111 is extracted and supplied to the search engine as a search key. The search engine traverses the table representation of the TS range trie 112 to identify a node with a TS prefix that most closely matches the packet TS, as described in greater detail below. The TS range or TS range ID corresponding to the identified node is then output from the search engine.

Based on the respective TS ranges of the data packets and associated channel IDs or source device IDs, the network switch 110 may selectively drop some packets and reroute the rest through the egress port Y, e.g., by using a packet processing component 116. In the case that the network switch is disposed at the beginning of a network path, this approach offers the benefit of dropping duplicate or unnecessary streams at the beginning of the network path instead of at the end-host.

Compared with another approach of determining packet TS ranges by using a direct lookup approach, using a trie data structure to search for matching TS ranges advantageously and significantly reduces the memory capacity and memory bandwidth specified for adequately storing and accessing the TS values in a lookup table. In addition, embodiments may also reduce the time specified to produce a search result. Matches may be obtained in a fixed and deterministic latency, which is typical in a ternary content addressable memory (TCAM)-based search engine. Further, high scalability can be achieved in term of search even performance as the TS width increases and the lookup table size grows.

The network switch may also include a table 114 combining DIP addresses and TS ranges, and a search engine operable to search the table 114 for a new DIP address 115 for each packet based on its TS range ID 113. In some embodiments, the DIP addresses and TS ranges in the table may also be organized in a trie data structure. Based on the TS range ID, the new DIP address, the channel ID of the packet, the network switch 110 can forward the packet to the intended new DIP address which corresponds to the gateway 151 coupled to the device Destination 1.

It will be appreciated that TS ranges as determined according to the present disclosure can be used alone, or in conjunction with any other information related to the packet, for any type of operation or application in a network switch that is well known in the art. For example, the determined packet TS ranges can be used for channel switching, network performance and monitoring, accurate delay measurement, color-based delay and loss measurement, network updates, load balancing, e.g., in an Equal-Cost Multipath (ECMP) scheme.

Further, the process of using a trie data structure to determine a matching TS range for a packet can be implemented in any type of network node without departing from the scope of the present disclosure, e.g., routers, gateways, TV set-top boxes, and SDN controllers.

Figure 2:
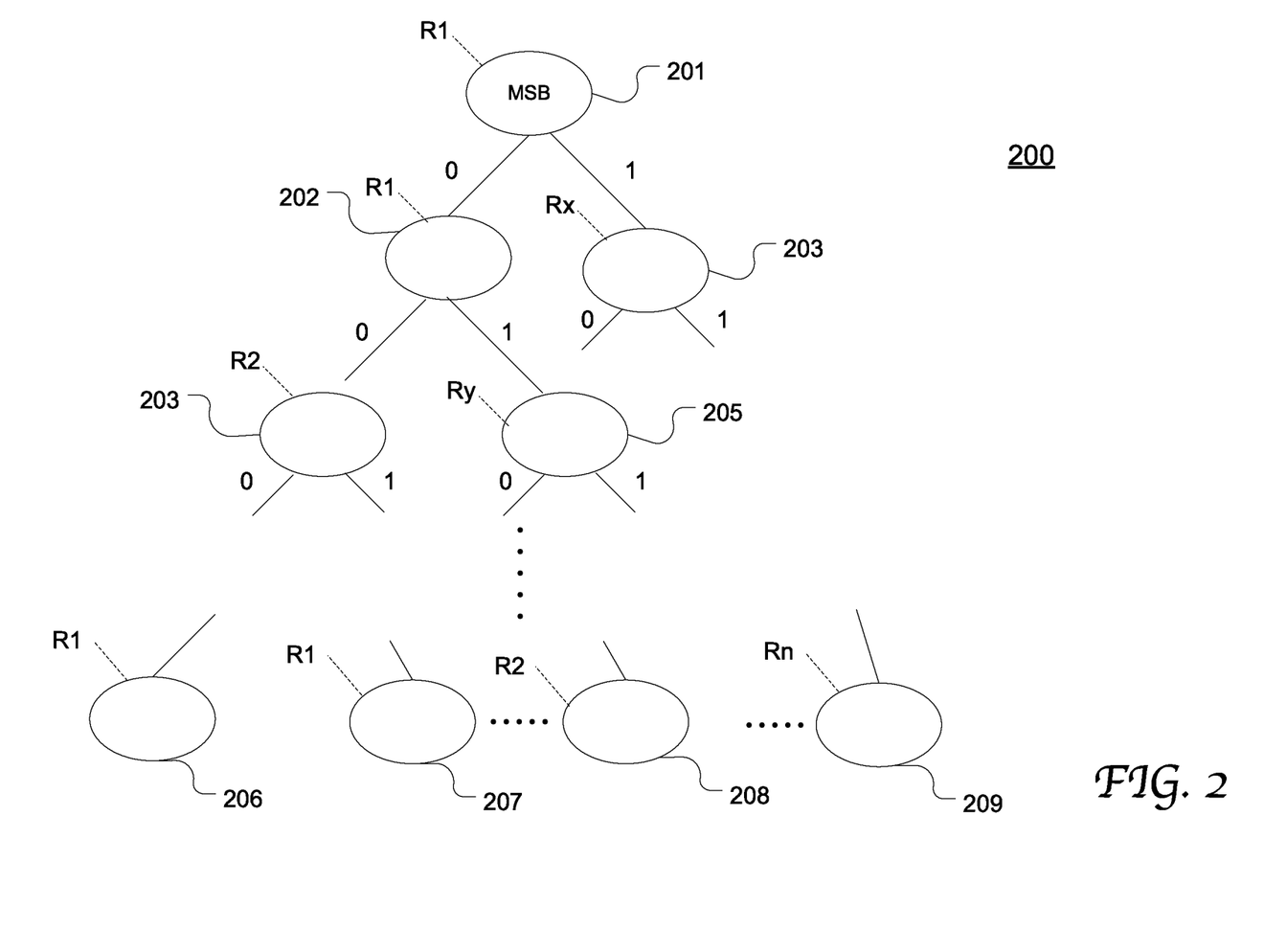
FIG. 2 illustrates the configuration of an exemplary TS range trie in accordance with an embodiment of the present disclosure.

FIG. 2 illustrates the configuration of a TS range trie 200 in accordance with an embodiment of the present disclosure. The trie 200 is composed of nodes (e.g., 201-208) and paths linking the nodes. Each node is assigned with a TS prefix entry, which is a segment of a TS, e.g., IPv4 or IPv6 TS prefixes. In accordance with this data structure, all the descendent nodes of a specific node share the same prefix with the node. Each node is also associated with a TS range with defined starting time and ending time or a TS range ID, represented as R1, R2, . . . , Rn.

In this example, the trie 200 is configured as a bitwise trie capable of storing $2^{32}$ entries of TS prefix values for lookup, leading to $2^{32}$ leaf nodes. Thus, the trie has a stride of 32. Each TS range corresponds to a valid leaf node. Each node is associated with two links designated with 1-bit digital values, e.g., "1" and "0" respectively. The root node may represent the most significant bit of the TS.

During operation, the TS range search engine uses a packet TS as a key and traverses the trie 200 to locate the node representing a value that matches or most specifically matches the packet TS. The key can be represented in the trie as a path from the root node to selected internal nodes until the matching leaf node is reached. The TS range associated with the matching node is then output from the search engine.

However, it will be appreciated that the trie data structure 200 is merely exemplary and various other trie data structures can be used to determine TS ranges for packets without departing from the scope of the present disclosure. For example, the TS range trie can be a compressing trie with merged common branches, or a combination trie structure including sub-tries which may be organized in a hierarchy. Further, the present disclosure is not limited by the size, the granularity, the stride, or the number of predetermined TS ranges of a TS range trie; nor limited to any specific implementation of the table representation of a TS range trie. The particular trie structure and characteristics may be application-specific and implementation-specific. The TS range trie table can be implemented in any suitable manner and using hardware, software or a combination thereof. For example, the TS range trie can be a memory resident data structure.

In some other embodiments, a TS range trie is implemented as a multi-bit trie which has a degree of nodes being more than 2 and can provide accelerated lookup search as opposed to a bitwise trie. The trie may be implemented using a Longest Prefix Match (LPM) table associated with an LPM search engine. If the search engine traverses the TS range trie and discovers more than one matching table entries, the most specific of the matching table entries, e.g, the one with the longest prefix, is selected as the winner.

Figure 3:
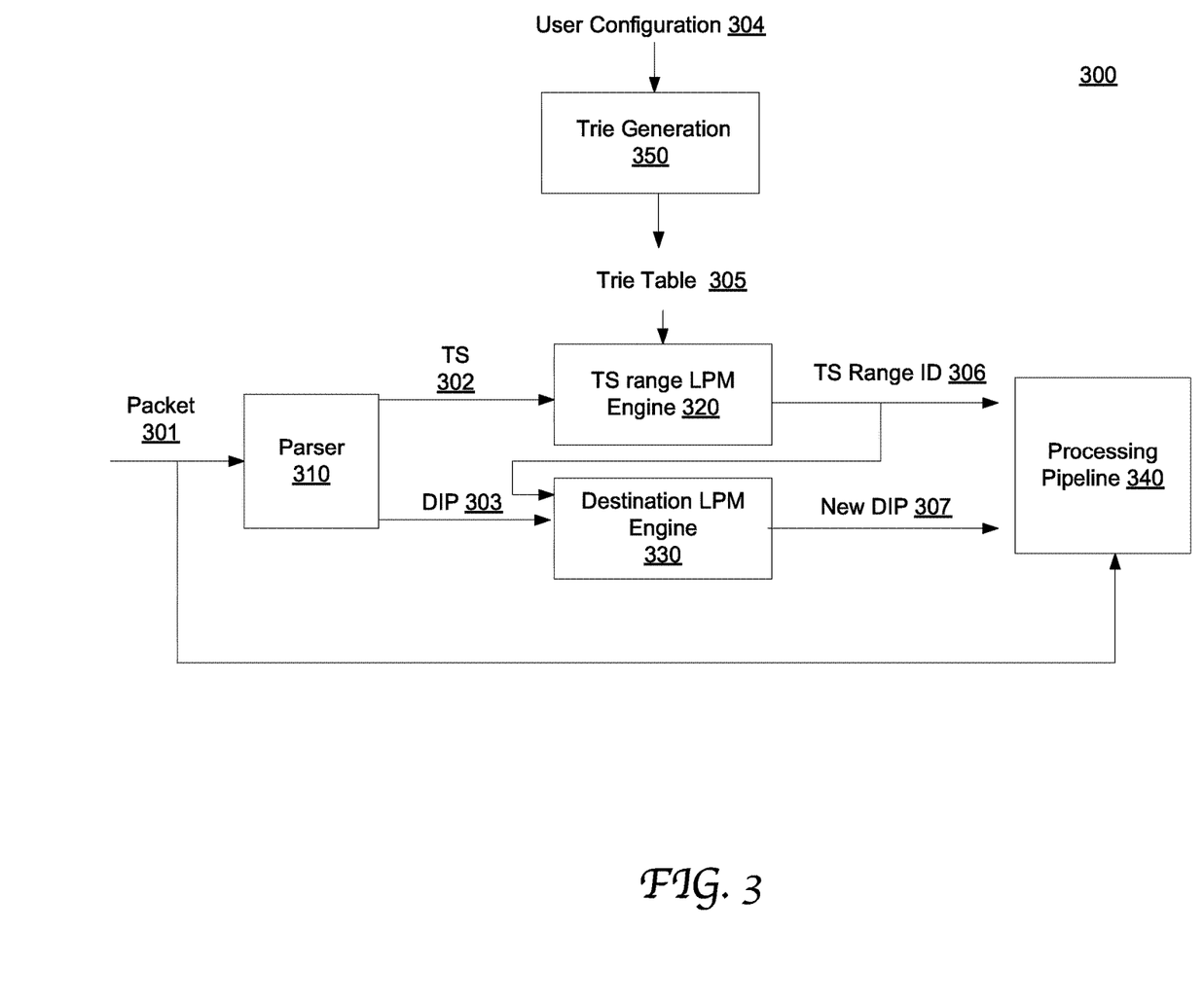
FIG. 3 illustrates an exemplary process and data flow of determining a TS range for a received packet and processing the packet based on the determined TS range in a network switch in accordance with an embodiment of the present disclosure.

FIG. 3 illustrates the exemplary process and data flow of (1) determining a TS range for a received packet and (2) processing the packet based on the determined TS range in a network switch 300 in accordance with an embodiment of the present disclosure. In this example, the network switch includes a trie generation engine 350 that can automatically generate a table representation of a TS range trie based on a user configuration. For example, the network switch may render a user interface to receive user specification for TS ranges, TS range granularity, stride, and various other metrics that are well known in the art.

In the illustrated embodiments, the trie data structure is represented by an LPM table 305. Correspondingly, the TS range look up engine is an LPM engine. However, it will be appreciated that the present disclosure is not limited thereto. Similarly, the trie generation engine 350 may also be capable of generating table representations of other tries used in the network switch 300 based on user configurations, such as a trie programmed for looking up new DIP addresses for the packets based on their respective TS ranges.

Once a packet 301 is received at the network switch, a parser 310 operates to extract the TS 302 and DIP address 303 from the packet. The TS 302 is supplied to the TS range LPM engine 320 as a search key to search through the TS range trie table 305. The TS range LPM engine 320 performs the search and outputs the resultant TS range ID 306.

The TS range ID 306 and the DIP address 303 extracted from the packet are supplied to the destination LPM engine 330 configured to search through a DIP address LPM table. The destination LPM engine 330 performs the search and outputs a new DIP address 307 and/or an egress port.

The packet 301 is supplied to a processing pipeline 340 for further processing based on the TS range ID 306 and the new DIP address 307. The processing pipeline 340 may include various function modules and application programs that are well known in the art. The pipeline 340 can modify the packet with the new DIP address, assign an egress port of the network switch for the packet, perform Network Address Translation (NAT) for the network packet, multicast the packet, redirect the packet to a multicast device, drop the packet, or evaluate network performance.

Figure 4:
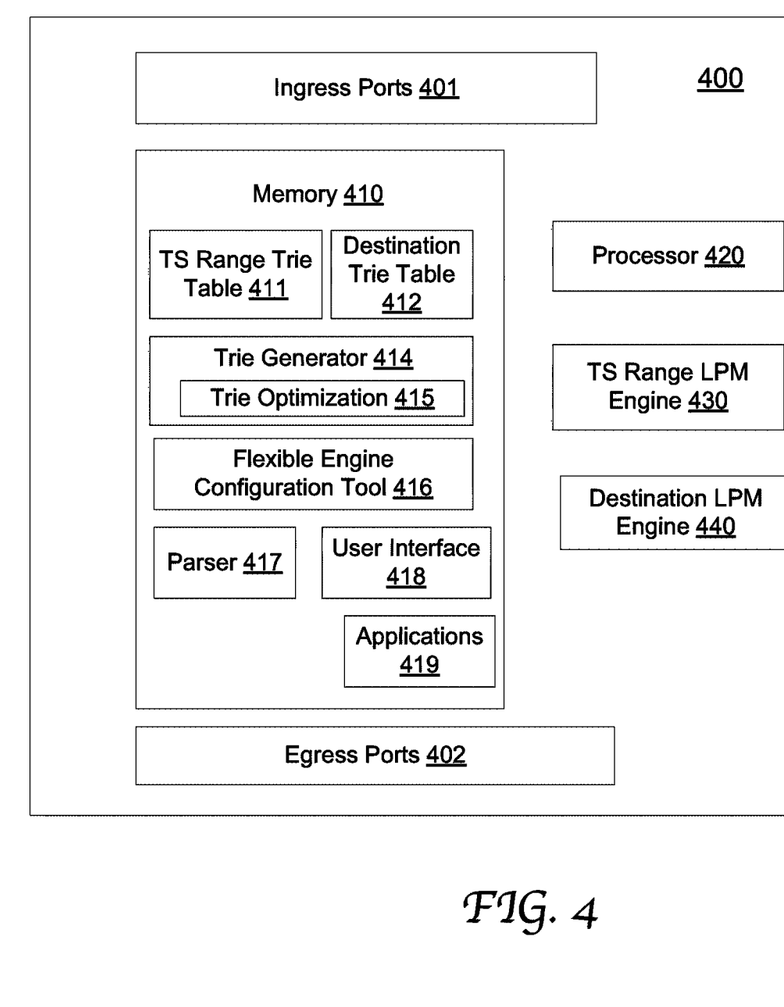
FIG. 4 illustrates the configuration of an exemplary network switch in accordance with an embodiment of the present disclosure.

FIG. 4 illustrates the configuration of an exemplary network switch 400 in accordance with an embodiment of the present disclosure. The network switch 400 includes ingress ports 401 for received packets and egress ports for transmitting the packets over a communication network. The network switch also includes memory 410, a processor 420, a TS range LPM engine 430, a destination LPM engine 440. The memory 140 stores a TS range trie table 411 representing a TS range trie, a destination trie table 412 representing a DIP address trie, and a parser 417 operable to parse a packet to extract the TS and DIP address contained therein, as described in greater detail above. The memory may also include various other lookup tables and search engines, such as a Network Address Translation (NAT) table, an IP host and LPM table, Virtual Network Interface (VIF) table, a Multicast Distribution Tree (MDT) table, egress Access Control List (ACL) tables, and Forwarding Database (FDB) tables, etc. Some or all of the tables may be stored in Static Random Access Memory (SRAM) and Ternary Content-Addressable Memory (TCAM). However, any other memory type can also be used.

A trie generator 414 can receive user input and generate the TS range trie table 411 and the destination tri table 412. The trie generator 414 includes an optimization module 415 that can optimize space usage and other aspects of a trie structure. The trie generator 414 can be implemented in any suitable manner that is well known in the art.

The TS range LPM engine 420 and the destination LPM engine 440 may be implemented using hardware primitives and using optimized Static Random Access Memory (SRAM) having deterministic lookup latency. Alternatively, the LPM engines 420 and 440 may be implemented in software logic. In some embodiments, the LPM engines 420 and 440 are user-configurable, e.g., so-called flexible engines. The memory 410 further includes a flexible engine configuration tool that can configure the LPM engines 420 and 440 based on user input, as well as other flexible engines in the network switch 400.

Further, the memory 410 stores instructions, executable by the processor 420, that implement a user interface 418 operable to receive user input, e.g., for the trie generator 414, the flexible engine 416, and the application programs 419 in the network switch 400. It will be appreciated that the network switch 400 may include a wide range of other components and functional modules that are well known in the art, such as a scheduler, a traffic manager, packet buffers, a multicast engine, a Network Address Translation (NAT) module, and a rewrite engine.

Figure 5:
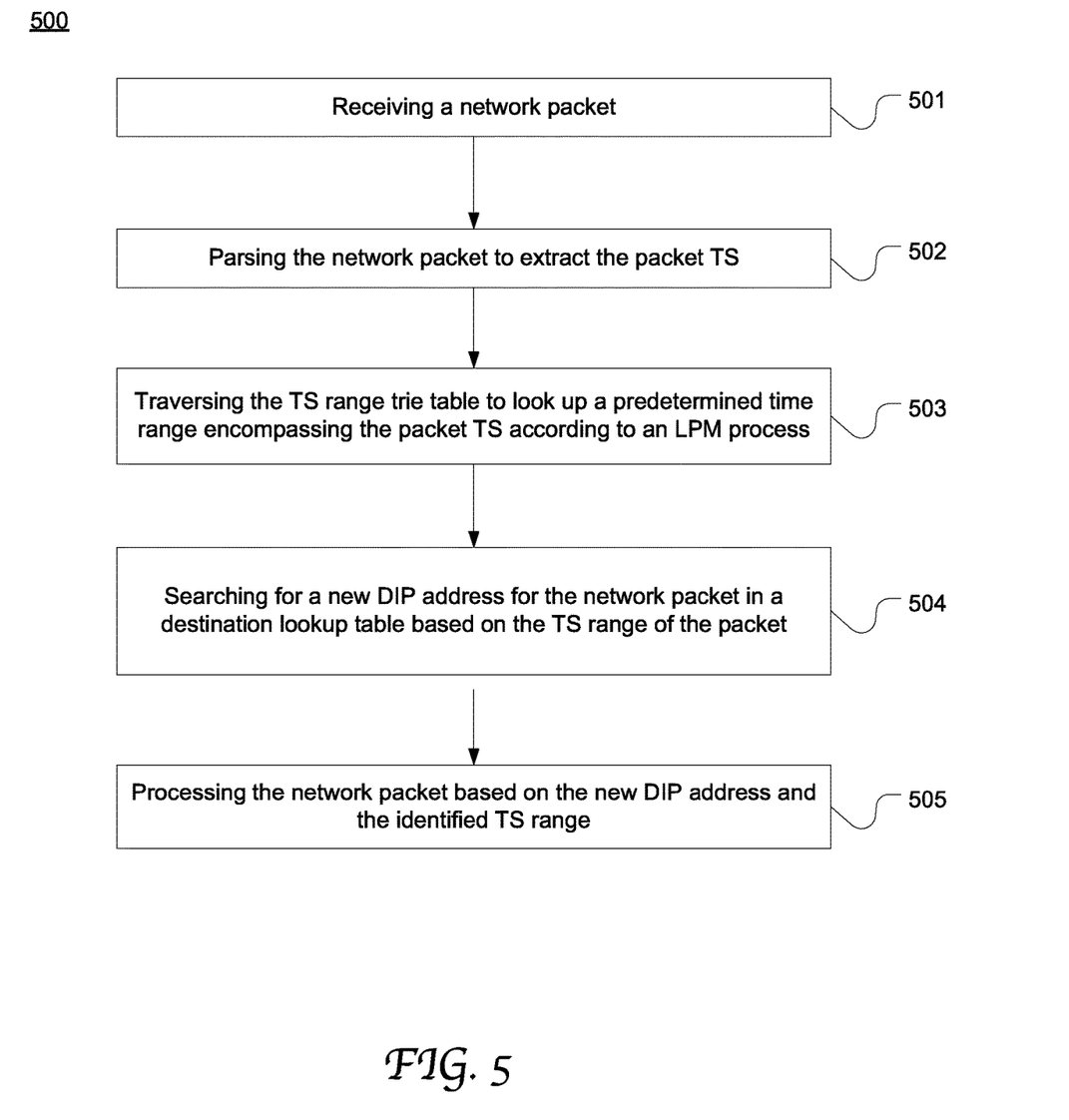
FIG. 5 is a flow chart depicting an exemplary process of determining a TS range for a packet and processing the packet based on the identified TS range in accordance with an embodiment of the present disclosure.

FIG. 5 is a flow chart depicting an exemplary process 500 of determining a TS range for a packet and processing the packet based on the identified TS range in accordance with an embodiment of the present disclosure. Process 500 may be performed by a network switch as illustrated in FIG. 4 or by any other suitable network node or network device components. At 501, a packet transmitted from a communication link is received or otherwise accessed. At 502, the protocol format of the packet is identified, for example as a Real-Time Transport Protocol (RTP) packet. According to the identified format, the packet is parsed to extract the TS contained therein. The TS may have been attached to the packet when the packet is generated in a source device as shown in FIG. 1. However, the present disclosure is not limited thereto.

At 503, a table representation of a TS range trie is traversed to look up a predetermined time range encompassing the packet TS, where the extracted packet TS is used as the search key. In the case that the table is implemented as an LPM table, the lookup process is executed according to an LPM process. As a result, a matching TS range is output and associated with the packet.

At 503, a destination lookup table including predetermined TS ranges and DIP addresses is traversed for determining a new DIP address for the packet based on its TS range as well as other information related to the packet. As a result, a new DIP address for the next hop, along with an egress port, is then output.

At 504, the packet is processed based on the new DIP address and the TS range and according to a variety of processing logic and application programs, such as channel switching, network performance and monitoring, accurate delay measurement, color-based delay and loss measurement, network updates, and load balancing, e.g., Equal-Cost Multipath (ECMP) scheme.

Figure 6:
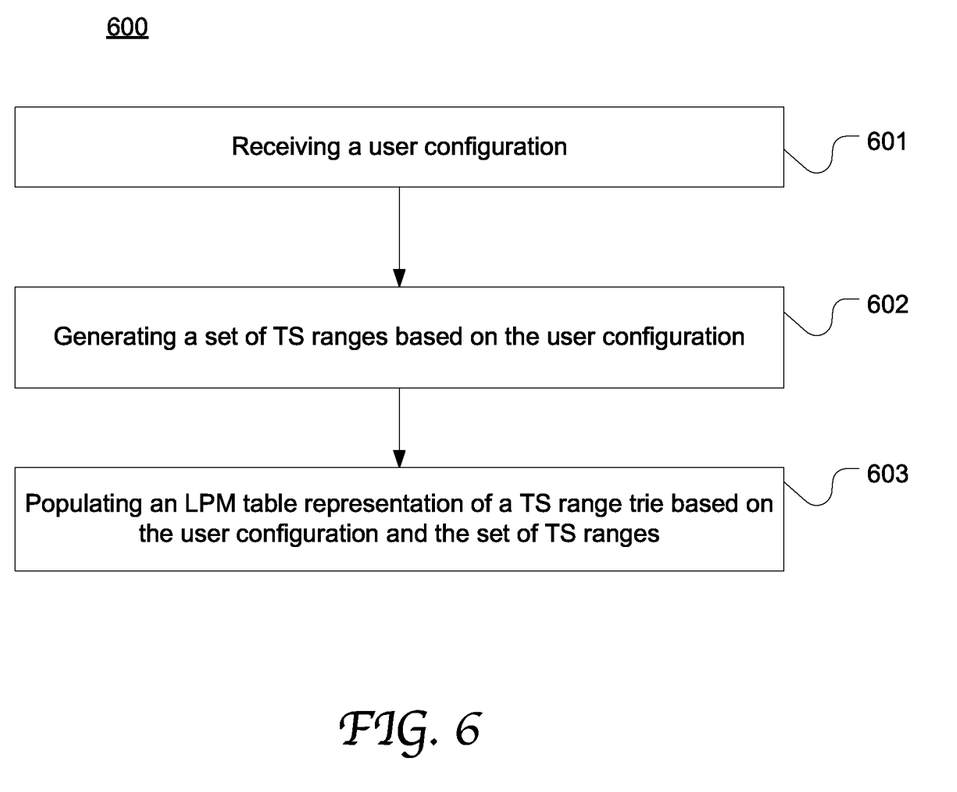
FIG. 6 is a flow chart depicting an exemplary process of automatically generating or updating a TS range trie table based on user input in accordance with an embodiment of the present disclosure

FIG. 6 is a flow chart depicting an exemplary process 600 of automatically generating or updating a TS range trie table based on user input in accordance with an embodiment of the present disclosure. Process 600 may be performed by a trie generator 414 as shown in FIG. 4 or any other suitable component in a network device. At 601, a user configuration is received through a user interface which is configured to receive user specified values for TS ranges, TS range granularity, stride, and various other applicable metrics. At 602, a set of predetermined TS ranges are automatically generated based on the user configuration, e.g., based on the granularity, a start time, an end time, the packet format. At 603, an LPM table representation of a TS range trie is populated based on the user configuration and the predetermined TS ranges, as described in greater detail with reference to FIG. 2.

Other approaches, including using a hash table or Ternary Content Addressable Memory (TCAM) may use a hash table needs to store $2^{32}$ entries of timestamp values, for 32-bit timestamps. However, in embodiments described herein, both memory capacity and a search time of timestamp values are decreased significantly. Thus, embodiments may have higher efficiency and increased scalability. Further, existing network switches are able to quickly adjust to new protocols and behaviors as desired in custom network applications.

Although certain embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A method of managing network traffic, said method comprising:
   accessing a network packet that is received at an input interface of a network node of a communication network;
   extracting a timestamp from said network packet;

generating a plurality of predetermined time ranges based on a user configuration;

traversing a table representation of a trie data structure to search for a predetermined time range from said plurality of predetermined time ranges, wherein said predetermined time range encompasses said timestamp, and wherein a respective node in said trie data structure corresponds to a timestamp prefix and is associated with a corresponding predetermined time range of said plurality of predetermined time ranges; and processing said network packet based on said predetermined time range.

2. The method of claim 1, wherein said traversing comprises:

feeding said timestamp to a first lookup engine as a search key; and using said first lookup engine to search through said table representation of said trie data structure and to select said predetermined time range according to a Longest Prefix Match (LPM) process.

3. The method of claim 1, wherein said extracting comprises:

identifying a protocol format of said network packet and parsing said network packet to derive said timestamp, and wherein said network packet comprises video data.

4. The method of claim 1, further comprising:

receiving the user configuration related to said plurality of predetermined time ranges; and automatically generating said table representation of said trie data structure based on said user configuration and according to a trie structure optimization process, wherein said trie data structure comprises a bitwise trie data structure.

5. The method of claim 2, wherein said network packet received at said input interface comprises a first destination Internet Protocol (IP) address, said method further comprising:

using a second lookup engine to search for a second DIP address for said network packet, wherein said search for said second DIP address is based on said predetermined time range; and modifying said network packet with by using said second DIP address;

wherein said processing of said network packet is further based on said second DIP address.

6. The method of claim 5, wherein said processing comprises one or more of:

assigning an egress port of said network node for said network packet;

performing Network Address Translation (NAT) for said network packet;

multicasting said network packet;

dropping said network packet;

forwarding said network packet; and redirecting said network packet.

7. The method of claim 1, further comprising:

extracting a first destination Internet Protocol (DIP) address from said network packet; and determining a second DIP address based on said predetermined time range;

wherein said processing is based on said second DIP address and said predetermined time range.

8. A network switch comprising:

an ingress port configured to receive a network packet comprising a timestamp;

a trie generation unit configured to generate a plurality of predetermined time ranges based on a user configuration;

a memory configured to store a table representation of a trie data structure comprising nodes and links, wherein a respective node in said trie data structure corresponds to a timestamp prefix and is associated with a corresponding predetermined time range of said plurality of predetermined time ranges, and wherein each predetermined time range of said plurality of predetermined time ranges is defined by a start time and an end time;

a trie lookup engine configured to:

receive said timestamp; and traverse said table representation of said trie data structure to identify a predetermined time range matching said timestamp from said plurality of predetermined time ranges;

logic configured to process said network packet based on said predetermined time range; and an egress port configured to transmit said processed network packet over a communication link.

9. The network switch of claim 8, wherein said memory is further configured to store a table representation of destination Internet Protocol (DIP) addresses, wherein said network packet received at said ingress port comprises a first DIP address, and wherein said network switch further comprises:

an IP address lookup engine configured to search for a second DIP address for said network packet from said table representation of said DIP addresses based on said predetermined time range; and a processing pipeline configured to modify and process said network packet with said second DIP address.

10. The network switch of claim 8, wherein said trie data structure comprises a bitwise trie data structure.

11. The network switch of claim 8, wherein said trie generation unit is further configured to:

receive the user configuration related to said plurality of predetermined time ranges; and generate said table representation of said trie data structure based on said user configuration and according to a trie structure optimization process.

12. The network switch of claim 8, wherein said trie lookup engine is a flexible engine that is user-programmable.

13. The network switch of claim 8, wherein said trie lookup engine is further configured to: search through said table representation of said trie data structure; and identify said predetermined time range according to a Longest Prefix Match (LPM) process.

14. The network switch of claim 8, further comprising a parser configured to:

identify a protocol format of said network packet;

parse said network packet; and derive said timestamp from said network packet.

15. The network switch of claim 9, wherein processing of said network packet is further based on said second DIP address and comprises one or more of:

assigning an egress port of said network switch for said network packet;

performing Network Address Translation (NAT) for said network packet;

multicasting said network packet;

dropping said network packet;

forwarding said network packet; and redirecting said network packet.

16. A system comprising:
a first interface configured to receive a network packet;
a network switch coupled to said first interface and configured to:
  extract a timestamp from said network packet;
  generate a plurality of predetermined time ranges based on a user configuration;
  traverse a table representation of a trie data structure to search for a predetermined time range from said plurality of predetermined time ranges,
  wherein said predetermined time range encompasses said timestamp, and wherein a respective node in said trie data structure corresponds to a timestamp prefix and is associated with a corresponding predetermined time range of said plurality of predetermined time ranges; and
  process said network packet based on said predetermined time range; and
a second interface coupled to said network switch and configured to transmit said processed network packet over a communication link.

17. The system of claim 16, wherein said network switch comprises a first lookup engine configured to: use said timestamp as a search key to search through said table representation of said trie data structure; and select said predetermined time range according to a Longest Prefix Match (LPM) process.

18. The system of claim 16, wherein said network switch comprises a parser configured to:
  identify a protocol format of said network packet and
  parse said network packet to derive said timestamp, and wherein said network packet comprises video data.

19. The system of claim 16, wherein said network switch is further configured to:
  receive the user configuration related to said plurality of predetermined time ranges; and
  automatically generate said table representation of said trie data structure based on said user configuration and according to a trie structure optimization process, wherein said trie data structure comprises a bitwise trie data structure.

20. The system of claim 17, wherein said network packet received at said first interface comprises a first destination Internet Protocol (DIP) address, and wherein said network switch further comprises:
  a second lookup engine configured to search for a second DIP address for said network packet based on said predetermined time range; and
  a processing pipeline configured to modify and process said network packet using said second DIP address.

21. The system of claim 20, wherein processing of said network packet is further based on said second DIP address and comprises one or more of:
  assigning an egress port of said network switch for said network packet;
  performing Network Address Translation (NAT) for said network packet;
  multicasting said network packet;
  dropping said network packet;
  forwarding said network packet; and
  redirecting said network packet.

* * * * *